Patented Feb. 11, 1936

2,030,283

UNITED STATES PATENT OFFICE 2,030,283

CATALYST AND PROCESS FOR THE DECOMPOSITION OF HYDROCARBONS

Frank J. De Rewal, Camillus, N. Y., assignor to Atmospheric Nitrogen Corporation, New York, N. Y., a corporation of New York No Drawing. Application April 13, 1931, Serial No. 529,797

17 Claims. (Cl. 23—212)

This invention relates to the catalytic decomposition of hydrocarbons and in particular to a process for the production of hydrogen by the reaction of a hydrocarbon and water vapor and to a catalyst active in the decomposition of hydrocarbons and a process for the preparation of such a catalyst.

The use of hydrogen in industries such as ammonia synthesis hydrogenation of oil etc. demands a large supply of substantially pure hydrogen. In addition the preparation of oxygenated organic compounds by synthetic processes requires large quantities of gaseous mixtures containing hydrogen and oxides of carbon. It is known that hydrogen may be prepared by the catalytic decomposition of compounds containing hydrogen and in particular by the reaction of hydrocarbons and water vapor in the presence of suitable catalysts. It has been found desirable under certain circumstances to carry out the decomposition of the hydrocarbon in the presence of oxygen. Catalysts heretofore employed for the decomposition of hydrocarbons exhibit the tendency to become more or less completely oxidized when operated in the presence of free oxygen which may result in a substantial decrease in the activity of the catalyst. Such catalysts after oxidation require reduction in hydrogen and are then usually not as active as before oxidation.

It is an object of the present invention to provide a process for the preparation of a gas containing hydrogen such as a mixture of hydrogen and the oxides of carbon by effecting the decomposition of hydrocarbons in the presence of a catalyst comprising palladium.

It is a further object of this invention to provide an active catalyst adapted to promote the reaction between a hydrocarbon and steam. Another object of this invention is to provide a catalyst which is not injuriously affected by the presence of oxygen in the gaseous reaction mixture and which may be exposed to air or other gas at elevated temperatures and then employed for the decomposition of a hydrocarbon without a preliminary reduction by heating in contact with a reducing gas. Other objects of this invention will in part be obvious and will in part appear hereinafter.

I have discovered that the decomposition of gaseous hydrocarbons may be effected by passing a mixture comprising a hydrocarbon and water vapor at an elevated temperature over a catalyst comprising palladium. I have found that the activity of the catalyst in the decomposition of hydrocarbons may be accelerated by the presence in admixture with the palladium of an oxide of an element from the following group which comprises elements forming high melting, difficultly reducible oxides: magnesium, beryllium, cerium, titanium, horium, chromium, tungsten.

My invention accordingly comprises a catalyst for the decomposition of hydrocarbons comprising palladium with or without one or more other materials which serve to promote the catalytic activity of the palladium, and a process for the decomposition of hydrocarbons employing such a catalyst as a contact material to promote the decomposition reaction. My invention comprises, further, processes for the production of the aforesaid catalysts.

In its preferred embodiment, my invention comprises a catalyst for and a process of decomposing a hydrocarbon gas, such as natural gas which consists principally of methane, gas obtained by the distillation of bituminous coal, coal gas or water gas made from bituminous coal and water vapor, such gases preferably being substantially free from sulfur, wherein the hydrocarbon gas is mixed with water vapor and the mixture is then brought into contact with a catalyst comprising palladium precipitated in an alkaline medium. The invention further comprises the several steps and the relation of one or more of such steps with respect to each of the others and the catalyst possessing the features and properties which are exemplified in the following detailed disclosure and the scope of the invention will be indicated in the claims.

In general the catalysts of my invention may be produced by precipitating palladium from a solution, freeing the precipitate from soluble substances and drying the palladium. A suitable method of carrying out this process comprises precipitating palladium in a medium rendered alkaline by an excess of potassium or sodium hydroxide or carbonate, filtering off the resulting precipitate, washing the residue on the filter with distilled water until free from soluble material, and finally drying the palladium precipitate at a temperature of from 100° to 125° C.

A catalyst comprising a plurality of constituents as herein disclosed is advantageously prepared by precipitating palladium in an alkaline medium containing a suspension of one or more other substances, freeing the precipitate from soluble substances and drying the precipitate in a known manner. As an example of my process of producing a catalyst containing a plurality of constituents, I may add a solution comprising a compound of palladium, such as palladium chloride, to a solution of an alkali such as potassium hydroxide containing suspended therein a high melting difficultly reducible oxide of an element from the following group: magnesium, beryllium, cerium, titanium, thorium, chromium and tungsten; filtering the resulting solution, washing the residue with distilled water until free from soluble material, and drying the resulting material at a temperature of from 100° to 125° C.

The following examples of catalysts and suitable methods for their preparation are given by way of illustration and for a more complete understanding of my invention, it being understood, however, that the invention is not limited to the catalysts specifically described or to the details of the procedure for their preparation herein disclosed.

*Example 1.*—As an example of a preferred composition of my catalyst, I employ palladium, magnesium oxide and an oxide of cerium prepared as follows:

Suspend 22 parts by weight of finely powdered calcined magnesite and 0.25 part by weight of cerium oxide in 1,000 parts of boiling distilled water. To this add with stirring an excess of potassium hydroxide and 50 parts of palladium chloride solution containing 5% palladium. Continue the boiling for several minutes and then filter and wash with a large amount of hot distilled water until the wash water shows no chlorides when tested with silver nitrate solution. Dry the material at about 100° C. and compress into tablets. The approximate composition of the catalyst so prepared will be:

Catalyst A

| | Per cent |
|---|---|
| MgO | 89 |
| Pd | 10 |
| CeO$_2$ | 1 |

Substantially following the procedure of Example 1, but employing cerium oxide, thorium oxide and palladium chloride, I have prepared a catalyst of the following approximate composition:

Catalyst B

| | Per cent |
|---|---|
| CeO$_2$ | 93 |
| Pd | 5 |
| ThO$_2$ | 2 |

*Example 2.*—Add 28 parts of purified cerium oxide (finely powdered) and 4 parts of potassium carbonate to 1,000 parts of boiling distilled water, all parts by weight. Then add with stirring 15 parts of palladium chloride solution containing 5% palladium by weight. The palladium is precipitated on the powdered cerium oxide. Filter the mixture, wash the solids thoroughly with hot distilled water. Dissolve 1 part of ammonium dichromate in a small quantity of water and mix with the solids from the filter, dry the resulting material at about 120° C. and compress into tablets. The resulting catalyst will have the following approximate composition by weight:

Catalyst C

| | Per cent |
|---|---|
| CeO$_2$ | 95.5 |
| Pd | 2.5 |
| Cr$_2$O$_3$ | 2.0 |

Substantially following the procedure given in Example 2, I have also prepared catalyst of the following approximate composition:

Catalyst D

| | Per cent |
|---|---|
| CeO$_2$ | 93 |
| Pd | 5 |
| Cr$_2$O$_3$ | 2 |

Again substantially following the procedure of Example 2, but using magnesium oxide or powdered magnesite in place of cerium oxide, I have obtained a catalyst of the following composition:

Catalyst E

| | Per cent |
|---|---|
| MgO | 97.5 |
| Pd | 0.5 |
| Cr$_2$O$_3$ | 2 | and

Catalyst F

| | Per cent |
|---|---|
| MgO | 93 |
| Pd | 5 |
| Cr$_2$O$_3$ | 2 |

Further, by using titanium oxide in place of cerium oxide, in the above example, I have made catalysts comprising approximately

Catalyst G

| | Per cent |
|---|---|
| TiO$_2$ | 93 |
| Pd | 5 |
| Cr$_2$O$_3$ | 2 |

*Example 3.*—Add 28 parts of finely divided beryllium oxide and 30 parts of palladium chloride solution containing 5% Pd of 1,000 parts of boiling distilled water, all parts by weight. Add potassium carbonate until the palladium is precipitated but avoid an excess great enough to dissolve the beryllium oxide. Filter, wash thoroughly with hot water, and add to the solid material while still in a pasty mass 1 part of ammonium dichromate dissolved in a small amount of distilled water. Dry at about 120° C. and compress into tablets. The approximate composition of the catalyst will be:

Catalyst H

| | Per cent |
|---|---|
| Palladium | 5 |
| BeO | 93 |
| Cr$_2$O$_3$ | 2 |

The materials employed in preparing the catalyst may be either the oxides themselves, the metal or elements, or compounds of these metals or elements, which may be converted by my process to suitable form for the catalyst. It will be evident that I may employ natural occurring substances in admixture with palladium as my catalyst, and such naturally occurring material may be of particular value if it contains magnesium, beryllium, cerium, titanium, thorium, chromium or tungsten. For instance I may employ a catalyst comprising palladium and pumice, asbestos or rare earth ores. Such substances when present in admixture with the palladium may act as a promoter and/or carrier.

In preparing my improved catalyst, the materials above described may be used in varying proportions with regard to both the ratio of one constituent to the other and the ratio of the total amount of the other constituents employed. While the proportion by weight of the constituents in my catalyst may be varied within wide limits, I prefer to use from 0.5% to 10% palladium, from 89% to 97.5% of one oxide and from 1% to 3% of the other oxide, but my invention is not limited to catalysts comprising the constituents in the above proportions.

For the best results, the usual precaution with respect to the exclusion of contact poisons such as sulfur compounds, etc. should be observed in both the preparation and use of the catalyst.

It will be evident that modifications in the above procedures may be employed without transcending the scope of my invention. For example, instead of using potassium hydroxide or potassium carbonate as the precipitant, other alkalies may be used and instead of palladium chloride, other compounds of palladium which are soluble in water may be used. It has been found in general, that catalysts exhibiting a particularly high efficiency for promoting the reaction of the hydrocarbon and steam, may be prepared by precipitating palladium in an aqueous medium having a pH value of about 11 or greater, and particularly of from about 11 to about 14.

The catalysts described above and prepared according to my invention may be used in any of the known conversion systems for the decomposition of hydrocarbons. A suitable temperature range for the operation of the catalyst of my invention may comprise the range from 450° to 800° but in my improved process I prefer to operate at a temperature between 450° and 550° C. A mixture of natural gas and steam, for example, may be preheated to a temperature within the range of efficient operation of the catalyst, for example to a temperature of about 500° C. and then passed in direct contact with the catalyst contained in a suitable vessel or tube. If desired, the gaseous products leaving the catalyst may be again heated and passed in contact with a second catalytic mass for further treatment. Hydrocarbon and steam in the gas react to produce hydrogen and oxides of carbon. By removal of the oxides of carbon a hydrogen gas may be obtained which is suitable for use in many industrial processes wherein it is required. In case the gas is to be used for ammonia synthesis the required admixture of nitrogen with the hydrogen may be obtained by adding air to the reaction mixture of hydrocarbon and water vapor passed in contact with the catalyst of this invention.

A principal advantage of this invention resides in the fact that the catalysts comprising palladium above disclosed, have a high resistance to oxidation and hence are not easily affected by the presence of free oxygen in the reaction gas mixture. The catalysts of this invention may also be operated exposed to air or other gas at elevated temperatures without being injuriously affected by such operation. A further advantage of the catalysts of this invention lies in the fact that the catalysts above disclosed may be employed for the decomposition of a hydrocarbon with steam without a preliminary reduction by heating in contact with a reducing gas.

Since certain changes in carrying out the above process, and certain modifications in the composition which embody the invention may be made without departing from its scope, it is intended that all matter contained in the above description shall be interpreted as illustrative and not in a limiting sense.

I claim:

1. A catalyst active in promoting the reaction of methane and steam and comprising palladium, magnesium oxide and an oxide of cerium.

2. A catalyst active in promoting the reaction of methane and steam and comprising palladium, an oxide of cerium and an oxide of chromium.

3. A palladium catalyst for promoting the reaction of a hydrocarbon and steam, the palladium of the catalyst being precipitated in a medium maintained alkaline.

4. A palladium catalyst for promoting the reaction of methane and steam, the palladium of the catalyst being precipitated in a medium maintained alkaline.

5. A catalyst for promoting the reaction of a hydrocarbon and steam and comprising palladium and an oxide of an element from the following group: magnesium, beryllium, cerium, titanium, thorium, chromium, tungsten, said palladium of the catalyst being precipitated in a medium maintained alkaline.

6. A process for producing a palladium catalyst for promoting the reaction of a hydrocarbon and steam, which comprises precipitating the palladium of said catalyst in a medium maintained alkaline.

7. A process for producing a catalyst which comprises precipitating palladium in a medium maintained alkaline containing a high melting, difficultly reducible oxide of an element from the following group: magnesium, beryllium, cerium, titanium, thorium, tungsten; freeing the precipitate of soluble substances and mixing said precipitate with a substance comprising chromium.

8. A process for the decomposition of methane which comprises reacting a mixture of methane and steam in the presence of a palladium catalyst, the palladium of said catalyst being precipitated in a medium maintained alkaline.

9. A process for the decomposition of methane which comprises passing said methane together with steam at a temperature of about 450° C. to 550° C. in contact with a catalyst comprising palladium, an oxide of cerium and an oxide of chromium in the proportions of about 2.5% palladium, about 95.5% oxide of cerium and 2% oxide of chromium.

10. A palladium catalyst active in promoting the reaction of a hydrocarbon and steam, the palladium of the catalyst being precipitated in an alkaline medium having a pH value of about 11 or greater.

11. A process for producing a palladium catalyst active in promoting the reaction of a hydrocarbon and steam, which comprises precipitating the palladium of said catalyst in an alkaline medium having a pH value of about 11 or greater.

12. A process for the decomposition of hydrocarbons which comprises contacting a mixture of a hydrocarbon and steam with a palladium catalyst, the palladium of said catalyst being precipitated in an alkaline medium having a pH value of about 11 or greater.

13. A process for the decomposition of methane which comprises reacting a mixture of methane and steam in the presence of a palladium catalyst, the palladium of said catalyst being precipitated in an alkaline medium having a pH value of about 11 or greater.

14. The process of preparing a palladium catalyst which comprises adding an oxide of a metal of the group consisting of magnesium, beryllium, cerium, titanium, thorium and tungsten to an alkaline solution, and then adding to said solution a soluble palladium salt to precipitate palladium on said oxide.

15. The process of preparing a palladium catalyst which comprises adding an oxide of a metal of the group consisting of magnesium, beryllium, cerium, titanium, thorium, chromium, and tungsten to a solution having a pH value of about 11 or greater, and then adding to said solution a solution of a palladium salt to precipitate palladium on said oxide.

16. A process for the decomposition of methane which comprises reacting a mixture of methane and steam in the presence of a catalyst comprising palladium, magnesium oxide and an oxide of cerium.

17. A process for the decomposition of hydrocarbons which comprises reacting a mixture of a hydrocarbon and steam in the presence of palladium as a catalyst, said palladium being precipitated in a medium maintained alkaline.

FRANK J. DE REWAL.